US011490357B2

(12) United States Patent
Lim et al.

(10) Patent No.: US 11,490,357 B2
(45) Date of Patent: Nov. 1, 2022

(54) METHOD AND ELECTRONIC DEVICE FOR TRACKING POSITION OF ACCESS POINT

(71) Applicant: Samsung Electronics Co., Ltd., Gyeonggi-do (KR)

(72) Inventors: Chaiman Lim, Gyeonggi-do (KR); Jinwoo Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 17/259,225

(22) PCT Filed: Jul. 10, 2019

(86) PCT No.: PCT/KR2019/008458
§ 371 (c)(1),
(2) Date: Jan. 11, 2021

(87) PCT Pub. No.: WO2020/013587
PCT Pub. Date: Jan. 16, 2020

(65) Prior Publication Data
US 2021/0258914 A1    Aug. 19, 2021

(30) Foreign Application Priority Data
Jul. 13, 2018   (KR) .......................... 10-2018-0081905

(51) Int. Cl.
*H04W 24/00* (2009.01)
*H04W 64/00* (2009.01)
*H04W 4/02* (2018.01)

(52) U.S. Cl.
CPC ......... *H04W 64/003* (2013.01); *H04W 4/023* (2013.01)

(58) Field of Classification Search
CPC ........................... H04W 64/003; H04W 4/023
See application file for complete search history.

(56) References Cited

U.S. PATENT DOCUMENTS 7,397,424 B2   7/2008   Houri
7,696,923 B2   4/2010   Houri
(Continued)

FOREIGN PATENT DOCUMENTS

KR   10-2012-0070173 A   6/2012
KR   10-2016-0139796 A   12/2016
WO   2005/088991 A1   9/2005

*Primary Examiner* — Erika A Washington
(74) *Attorney, Agent, or Firm* — Cha & Reiter, LLC

(57) ABSTRACT

Provided is an electronic device including a memory storing identifiers of a plurality of access points (APs) and position information associated with the plurality of APs, at least one communication circuit, and at least one processor operatively connected with the memory and the at least one communication circuit. The electronic device may be configured to receive an AP list including information on a plurality of first APs using the communication circuit, obtain a representative position corresponding to at least a portion of the plurality of first APs based on positions corresponding to the plurality of first APs stored in the memory, and update position information of at least one second AP of the plurality of first APs stored in the memory based at least on the representative position if a position of the at least one second AP is a specified distance or more away from the representative position. In addition to the above, various embodiments identified through the specification are possible.

13 Claims, 11 Drawing Sheets

(56) References Cited

U.S. PATENT DOCUMENTS

| | | |
|---|---|---|
| 7,801,542 B1 | 9/2010 | Stewart |
| 8,391,909 B2 | 3/2013 | Stewart |
| 8,433,334 B2 | 4/2013 | Huang et al. |
| 8,565,788 B2 | 10/2013 | Houri |
| 9,119,168 B2 | 8/2015 | Huang et al. |
| 9,398,558 B2 * | 7/2016 | Morgan ............... H04W 4/029 |
| 9,402,154 B2 | 7/2016 | Houri |
| 9,408,178 B2 | 8/2016 | Mayor et al. |
| 10,349,374 B2 | 7/2019 | Mayor et al. |
| 2011/0136505 A1 | 6/2011 | Stewart |
| 2011/0136506 A1 | 6/2011 | Stewart |
| 2011/0137813 A1 | 6/2011 | Stewart |
| 2011/0176523 A1 | 7/2011 | Huang et al. |
| 2013/0231132 A1 | 9/2013 | Huang et al. |
| 2013/0267242 A1 * | 10/2013 | Curticapean .......... G01S 5/0242 |
| | | 455/456.1 |
| 2014/0206379 A1 * | 7/2014 | Mayor ................ H04W 64/006 |
| | | 455/456.1 |
| 2014/0342756 A1 | 11/2014 | Houri |
| 2016/0345289 A1 | 11/2016 | Mayor et al. |
| 2019/0387357 A1 | 12/2019 | Houri |

* cited by examiner

METHOD AND ELECTRONIC DEVICE FOR TRACKING POSITION OF ACCESS POINT

CROSS REFERENCE TO RELATED APPLICATIONS

This application is a National Phase Entry of PCT International Application No. PCT/KR2019/008458, which was filed on Jul. 10, 2019, and claims a priority to Korean Patent Application No. 10-2018-0081905, which was filed on Jul. 13, 2018, the contents of which are incorporated herein by reference.

TECHNICAL FIELD

Embodiments disclosed in the present disclosure relate to a method for tracking a position of an access point and an electronic device therefor.

BACKGROUND ART

With the spread of mobile devices capable of recognizing positions, various position-based services are being provided. For example, the mobile device may obtain its position information based on a global navigation satellite system (GNSS). Since GPS-based positioning is performed based on satellite signals, it may be difficult to accurately measure the position of the mobile device indoors.

Various methods are being studied to supplement the limitations of GPS-based position-based services and perform more accurate positioning. For example, the positioning of the mobile device may be performed using a signal transmission device having a fixed position. The mobile device may obtain a wireless fingerprint (e.g., information on a beacon, access point (AP), or cell), and transmit the obtained wireless fingerprint information to an external electronic device (e.g., a server). For example, an external electronic device receiving the wireless fingerprint from the mobile device may estimate the position of the mobile device by using a database associated with the wireless fingerprint.

DISCLOSURE OF THE INVENTION

Technical Problem

In estimating the position of a mobile device based on the wireless fingerprint, it may be required to maintain and manage an accurate database. For example, the position of the mobile device may be estimated based on AP (e.g., WiFi AP) information. With the widespread of APs, a plurality of APs may be located in a small area. Therefore, positioning of the mobile device may be performed by using AP information without a separate device such as a Bluetooth beacon. In this case, a database including AP information and information on the associated position may be managed by an external electronic device. In addition, in order to manage a large number of APs, the external electronic device may manage the database based on crowd sourcing.

Since the AP is an electronic device having a relatively small size, the position of the AP may be easily changed. In addition, APs may be added or removed. In this case, a discrepancy may occur between the position information of the AP in the database of the external electronic device and the actual position. Furthermore, the accuracy of position estimation based on the wireless fingerprint including AP information may be reduced.

Technical Solution

Accordingly, an aspect of the present disclosure is to provide an electronic device including a memory storing identifiers of a plurality of access points (APs) and position information associated with the plurality of APs, at least one communication circuit, and at least one processor operatively connected with the memory and the at least one communication circuit, in which the at least one processor is configured to receive an AP list including information on a plurality of first APs using the communication circuit, obtain a representative position corresponding to at least a portion of the plurality of first APs based on positions corresponding to the plurality of first APs stored in the memory, and update position information of at least one second AP of the plurality of first APs stored in the memory based at least on the representative position if a position of the at least one second AP is a specified distance or more away from the representative position.

Another aspect of the present disclosure is to provide an electronic device including at least one communication circuit, at least one processor operatively connected with the at least one communication circuit, and a memory operatively connected with the at least one processor and storing identifiers of a plurality of access points (APs) and position information associated with the plurality of APs, in which the memory stores instructions that, when executed, cause the processor to receive an AP list including information on a plurality of first APs using the communication circuit, obtain a representative position corresponding to at least a portion of the plurality of first APs based on positions corresponding to the plurality of first APs stored in the memory, and update position information of at least one second AP of the plurality of first APs stored in the memory based at least on the representative position if a position of the at least one second AP is a specified distance or more away from the representative position.

Another aspect of the present disclosure is to provide an AP position update method of an electronic device, including receiving an AP list including information on a plurality of first APs, obtaining a representative position corresponding to at least a portion of the plurality of first APs based on positions corresponding to the plurality of first APs stored in a memory of the electronic device, and updating position information of at least one second AP of the plurality of first APs stored in the memory based at least on the representative position if a position of the at least one second AP is a specified distance or more away from the representative position.

Advantageous Effects

According to various embodiments disclosed in the present disclosure, the electronic device may maintain a database in which more accurate position information is reflected.

According to various embodiments disclosed in the present disclosure, the electronic device may provide position information having higher accuracy to another electronic device.

Besides, various effects may be provided that are directly or indirectly identified through the present disclosure.

BRIEF DESCRIPTION OF THE DRAWINGS

With respect to the description of the drawings, the same or similar reference signs may be used for the same or similar elements.

MODE FOR CARRYING OUT THE INVENTION

Hereinafter, various embodiments disclosed in the disclosure will be described with reference to the accompanying drawings. It should be appreciated that embodiments and the terms used therein are not intended to limit the technologies set forth herein to particular embodiments and include various changes, equivalents, and/or replacements for a corresponding embodiment.

Figure 1:
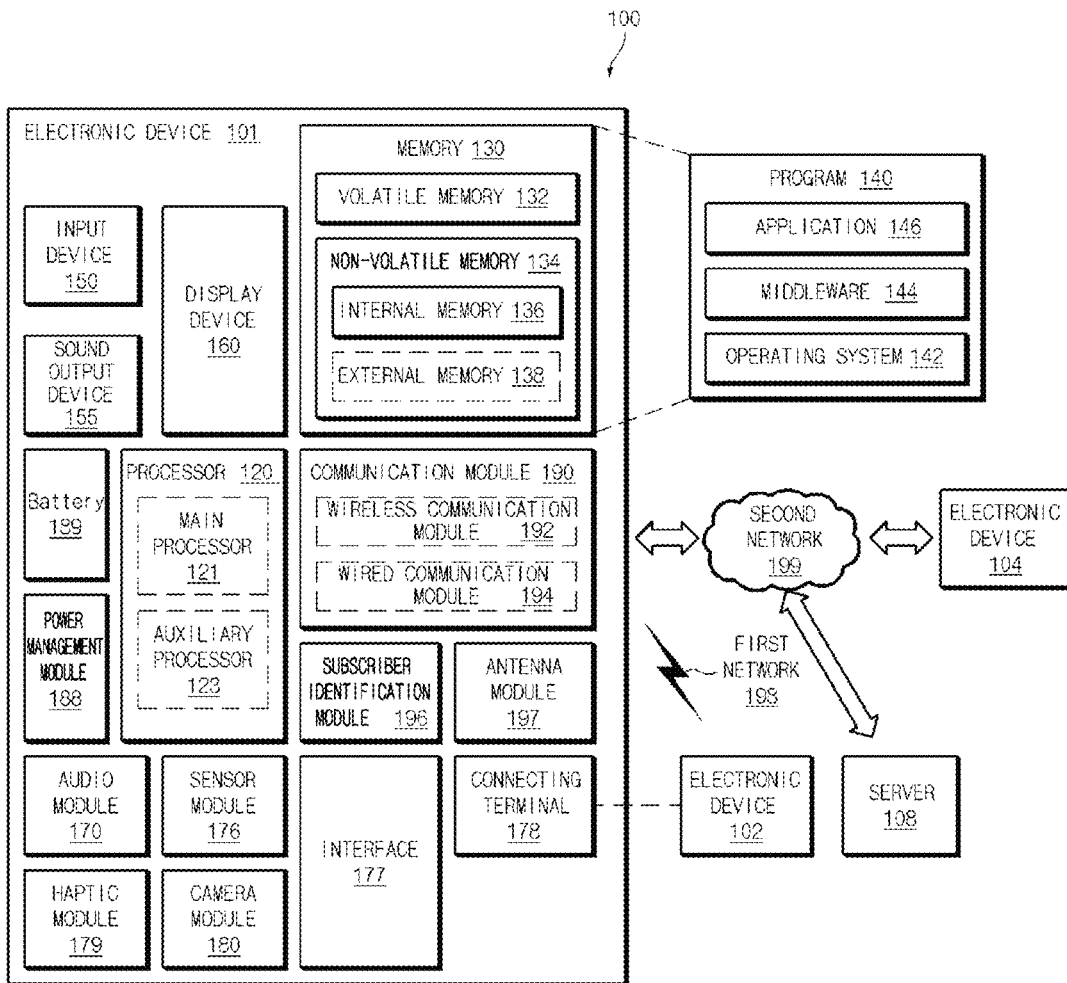
FIG. 1 illustrates a block diagram of an electronic device in a network according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108.

According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In various embodiments to be described below, operations of the various electronic devices 101 may be performed by the processor 120. For example, the processor 120 may control the operations of the electronic device 101 based on instructions stored in the memory 130. The configuration of the electronic device 101 illustrated in FIG. 1 is an example, and an electronic device 201 may not include at least some of the configurations illustrated in FIG. 1.

Figure 2:
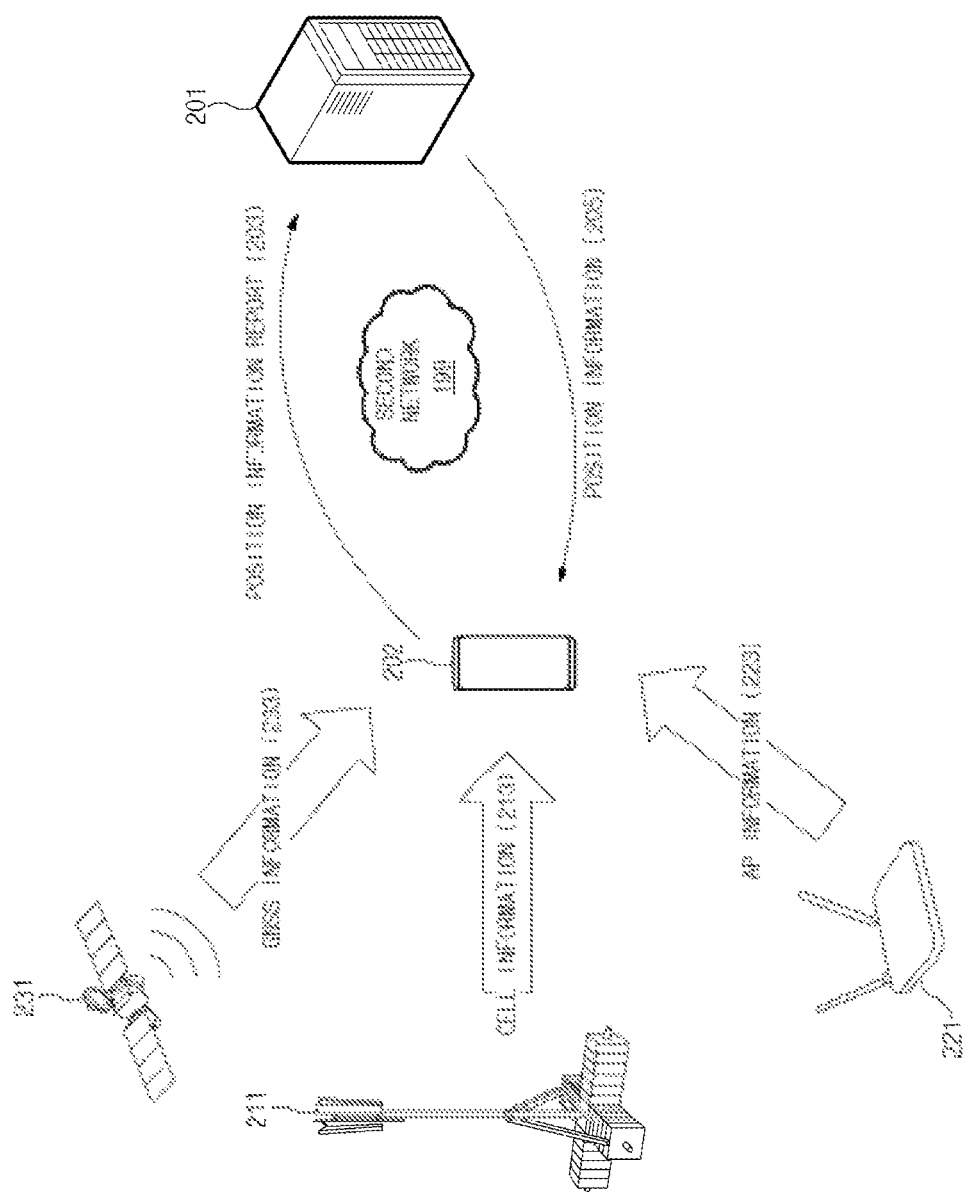
FIG. 2 illustrates a positioning environment according to various embodiments of the present disclosure.

FIG. 2 illustrates a positioning environment 200 according to various embodiments of the present disclosure.

Referring to FIG. 2, according to various embodiments of the present disclosure, an external electronic device 202 may obtain wireless fingerprint and/or position information from various sources. For example, the external electronic device 202 may obtain information from a base station 211, an AP 221 (e.g., a WiFi access point), and/or a satellite 231. The wireless fingerprint, position information, and/or position associated information of the external electronic device 202, which will be described below, are exemplary, and information that may be obtained by the external electronic device 202 is not limited thereto. In the following embodiments, the term "position associated information" refers to any information (e.g., wireless fingerprint, position information, and/or searched external device information) that may be used for positioning of the external electronic device 202. In the following embodiments, the external electronic device 202 may be assumed to be an electronic device having a structure similar to that of the electronic device 101 of FIG. 1. In FIG. 2, the electronic device 201 is illustrated in the form of a server device, but the form of the electronic device 201 is not limited thereto.

According to various embodiments of the present disclosure, the external electronic device 202 may obtain position associated information from the base station 211. For example, the external electronic device 202 may receive, from the base station 211, cell information 213 including a cell identifier. For example, the position of the base station 211 may be relatively fixed. According to an embodiment of the present disclosure, the electronic device 201 may estimate the position of the external electronic device 202 by using the position of the cell associated with the cell information 213 received by the external electronic device 202. Although only one base station 211 is illustrated in FIG. 2, embodiments of the present disclosure are not limited thereto. For example, the external electronic device 202 may receive cell information from a plurality of base stations and obtain the received cell information as position associated information.

According to various embodiments of the present disclosure, the external electronic device 202 may obtain position associated information from the AP 221. According to an embodiment of the present disclosure, the external electronic device 202 may receive, from the AP 221, AP information 232 including an identifier of the AP 221. For example, the external electronic device 202 may obtain the AP information 232 through AP scanning. For example, the identifier of the AP 221 may include a service set identifier (SSID) and/or a medium access control (MAC) address of the AP. According to an embodiment of the present disclosure, the electronic device 201 may estimate the position of the external electronic device 202 or manage a position associated with the AP 221, by using the AP information 232. Although only one AP 221 is illustrated in FIG. 2, embodiments of the present disclosure are not limited thereto. For example, the external electronic device 202 may receive AP information from a plurality of APs and obtain the received AP information as position associated information.

According to various embodiments of the present disclosure, the external electronic device 202 may obtain position associated information by using the satellite 231. For example, the external electronic device 202 may receive global navigation satellite system (GNSS) information 233 including information on latitude and longitude from the satellite 231. According to an embodiment of the present disclosure, the electronic device 201 may estimate the position of the external electronic device 202 or manage the database on position associated information, by using the GSNN information 233.

According to various embodiments of the present disclosure, the external electronic device 202 may obtain position associated information from a source not illustrated in FIG. 2. For example, the external electronic device 202 may obtain a signal received from a beacon (e.g., Bluetooth beacon) as position associated information.

According to various embodiments of the present disclosure, the external electronic device 202 may transmit a position information report 203 including the obtained position associated information to the electronic device 201. For example, the external electronic device 202 may transmit the position information report 203 to the electronic device 201, based on an arbitrary time point, a specified period, and/or a user input. For example, the external electronic device 202 may transmit the position information report 203 to the electronic device 201 through a second network 199. In the embodiments of the present disclosure, for the external electronic device 202, the time point of transmitting the position information report 203 and/or the method for transmitting the position information report 203 are exemplary, and the method for obtaining position associated information and the method for reporting position information, which are performed by the external electronic device 202, are not limited to the methods described above with respect to FIG. 2.

According to various embodiments of the present disclosure, the electronic device 201 may receive the position information report 203 from the external electronic device 202 and transmit position information 205 to the external electronic device 202. For example, the electronic device 201 may communicate with the external electronic device 202 through the second network 199. According to an embodiment of the present disclosure, the electronic device 201 may request that the external electronic device 202 transmit position information, and may receive the position information report 203 as response to the request. According to an embodiment of the present disclosure, the electronic device 201 may transmit the position information 205 in response to a request from the external electronic device 202. For example, if the position information report 203 is received, the electronic device 201 may estimate the position of the external electronic device 202 by using the position information report 203. The electronic device 201 may transmit the estimated position of the external electronic device 202 to the external electronic device 202 as the position information 205. For example, the electronic device 201 may estimate the position of the external electronic device 202 by using the database and position associated information of the electronic device 201.

According to various embodiments of the present disclosure, the electronic device 201 may manage a position database by using position associated information. For example, the electronic device 201 may receive the position information report 203 including the position associated information from the external electronic device 202, and may update, generate, and/or delete at least a portion of the database of the electronic device 201 by using the position associated information. According to an embodiment of the present disclosure, the database may include the position of the AP 221 corresponding to the identifier of the AP 221, the position of the base station 211 corresponding to the cell identifier, and/or an identifier and position information corresponding to a source of arbitrary position associated information.

Figure 3:
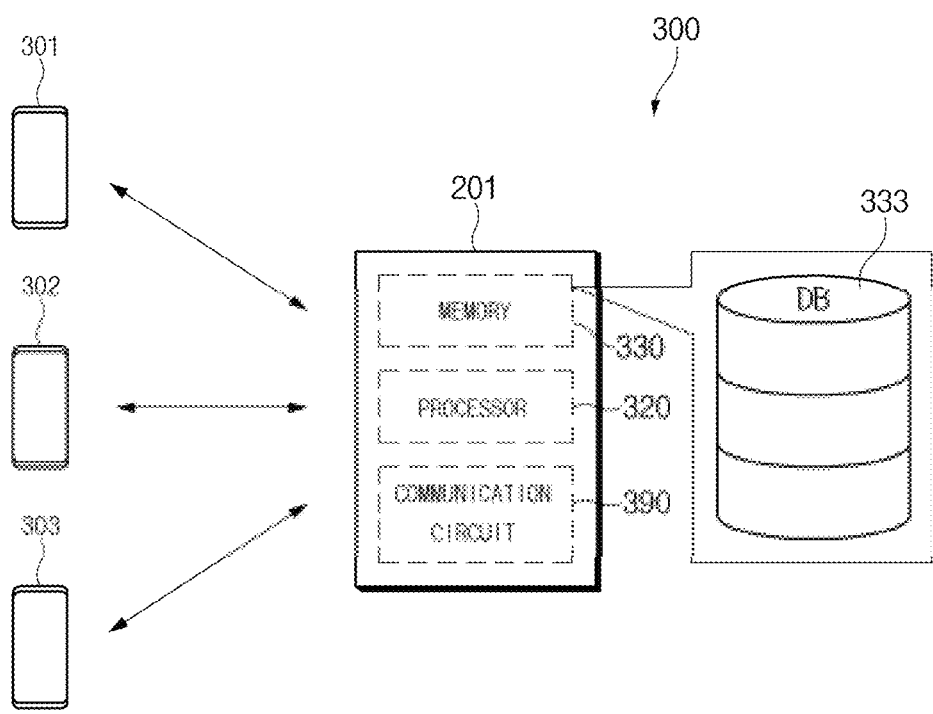
FIG. 3 illustrates a configuration of an electronic device in a positioning environment according to various embodiments of the present disclosure.

FIG. 3 illustrates a configuration of the electronic device 201 in a positioning environment 300 according to various embodiments of the present disclosure.

Referring to FIG. 3, it may be assumed that each of a first external electronic device 301, a second external electronic device 302, and a third external electronic device 303 may be an electronic device capable of performing operations of the external electronic device 202 of FIG. 2. For example, each of the first external electronic device 301, the second external electronic device 302, and the third external electronic device 303 may transmit position information report (e.g., the position information report 203 of FIG. 2) to the electronic device 201, or may receive position information (e.g., position information 205 of FIG. 2) from the electronic device 201.

According to various embodiments of the present disclosure, the electronic device 201 may include a processor 320 (e.g., the processor 120 of FIG. 1), a memory 330 (e.g., the memory 330 of FIG. 1), and/or a communication circuit 390 (e.g., the communication module 190 of FIG. 1). The electronic device 201 may further include a component not illustrated in FIG. 3.

According to various embodiments of the present disclosure, the processor 320 may be configured to control other components (e.g., the memory 330 and the communication circuit 390) of the electronic device 201. For example, the processor 320 may be operatively or electrically connected or coupled to other components of the electronic device 201. The processor 320 may be implemented as one chip or a plurality of chips. The processor 320 may include one or more of a central processing unit, an application processor (AP), a graphic processing unit (GPU), an image signal processor of a camera, or a baseband processor (BP) (or a communication processor (CP)). According to an embodiment of the present disclosure, the processor 320 may be implemented as a system on chip (SoC) or a system in package (SiP).

According to various embodiments of the present disclosure, the memory 330 may be operatively connected with the processor 320, and may store instructions for controlling the processor 320. According to an embodiment of the present disclosure, the memory 330 may store instructions that cause the processor 320 to perform operations of the processor 320 or the electronic device 201 to be described below.

According to various embodiments of the present disclosure, the memory 330 may store a database 333 including position information. For example, the database 333 may include an identifier of a source of position associated information and position information of the source. According to an embodiment of the present disclosure, the database 333 may include a cell identifier and position information corresponding to the cell identifier. According to an embodiment of the present disclosure, the database 333 may include an AP identifier and position information corresponding to the AP identifier. For example, the AP identifier may include a MAC address. The AP identifier may further include an SSID. Table 1 below is an example of an AP position database of the database 333.

TABLE 1

| MAC address | SSID | Latitude | Longitude |
|---|---|---|---|
| 00:00:00:00:00:01 | AP1 | 37.0 | 127.0 |
| 00:00:00:00:00:02 | AP2 | 37.1 | 127.1 |
| 00:00:00:00:00:03 | AP3 | 37.2 | 127.2 |
| . . . | . . . | . . . | . . . |
| 00:00:00:00:00:04 | AP4 | 37.7 | 127.7 |
| 00:00:00:00:00:05 | AP5 | 37.9 | 127.9 |

As described above with respect to FIG. 2, the processor 320 may estimate the position of an external electronic device (e.g., the first external electronic device 301, the second external electronic device 302, and/or the third external electronic device 303) by using the database 333. The processor 320 may manage the database 333 based on the position information report from the external electronic device. For example, the electronic device 201 may receive a position information report (e.g., a position information request) including at least one piece of AP information from the first external electronic device 301, and may estimate the position of the first external electronic device 301 by using the AP information included in the position information report and the database 333. For example, if the position information report received from the first external electronic device 301 includes identifiers (e.g., MAC addresses) corresponding to AP1, AP2, and AP3, the electronic device 201 may estimate the position of the first external electronic device 301 based on the positions corresponding to of AP1, AP2, and AP3 of the database 333.

According to various embodiments of the present disclosure, the communication circuit 390 may communicate with other external electronic devices (e.g., the first external electronic device 301, the second external electronic device 302, and/or the third external electronic device 303). For example, the communication circuit 390 may communicate with the first external electronic device 301, the second external electronic device 302, and/or the third external electronic device 303 via a second network (e.g., the second network 199 of FIG. 1). According to an embodiment of the present disclosure, the electronic device 201 may perform crowd sourcing of position information by receiving position associated information from various external electronic devices.

Figure 4:
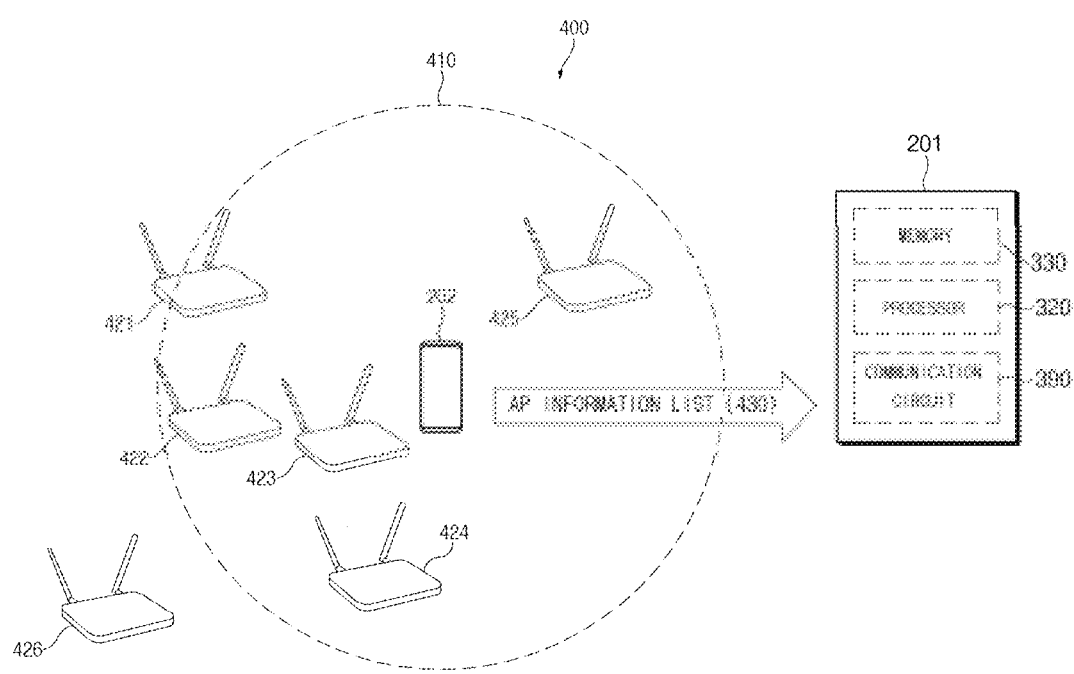
FIG. 4 illustrates an AP search environment of an external electronic device according to an embodiment of the present disclosure.

FIG. 4 illustrates an AP search environment 400 of the external electronic device 202 according to an embodiment of the present disclosure.

According to various embodiments of the present disclosure, the external electronic device 202 may perform an AP scan. For example, the external electronic device 202 may perform an AP scan based on a specified period, an arbitrary time, and/or a user input. For example, the external electronic device 202 may perform an AP scan by receiving information associated with the AP (e.g., an identifier of the AP) from each AP. According to an embodiment of the present disclosure, the external electronic device 202 may perform the AP scan by listening to a signal from the AP for a specified time.

According to various embodiments of the present disclosure, in the AP search environment 400, a first AP 421, a second AP 422, a third AP 423, a fourth AP 424, a fifth AP 425, and a sixth AP 426 may be positioned. According to an embodiment of the present disclosure, each AP may be assumed to have a substantially similar range of coverage. For example, each AP may be set to transmit a signal with a transmission power equal to or less than a specified transmission power due to communication environment regulations. According to an embodiment of the present disclosure, the external electronic device 202 may receive a signal from an AP positioned in a specified coverage 410. For example, the external electronic device 202 may receive signals from the first AP 421, the second AP 422, the third AP 423, the fourth AP 424, and the fifth AP 425, and may not receive the signal from the sixth AP 426. In this case, the external electronic device 202 may obtain AP information corresponding to the first AP 421, the second AP 422, the third AP 423, the fourth AP 424, and the fifth AP 425 through the AP scan.

According to various embodiments of the present disclosure, the external electronic device 202 may transmit, to the electronic device 201, AP list information 430 (e.g., position information report 203 of FIG. 2) including the AP information obtained through the AP scan. According to an embodiment of the present disclosure, the AP list information 430 may include AP information (e.g., an AP identifier) retrieved by the AP scan of the external electronic device 202. For example, the AP list information 430 may include AP information corresponding to each of the first AP 421, the second AP 422, the third AP 423, the fourth AP 424, and the fifth AP 425.

According to various embodiments of the present disclosure, the electronic device 201 may estimate the position of the external electronic device 202 based on at least a part of AP information included in the AP list information 430. For example, the electronic device 201 may assume that APs corresponding to the AP information included in the AP list information 430 have substantially the same distance as the external electronic device 202, and may estimate the position of the external electronic device 202 by using the position of the AP corresponding to the AP information stored in the database (e.g., the database 333 of FIG. 3). According to an embodiment of the present disclosure, the electronic device 201 may perform AP clustering on APs included in the AP list information 430, and may estimate the position of the external electronic device 202 by using the positions of the APs included in the AP cluster. For example, if the position of the fifth AP 425 is not included in the AP cluster, the electronic device 201 may estimate the position of the external electronic device 202 by using the first AP 421, the second AP 422, the third AP 423, and the fourth AP 424 excluding the position of the fifth AP 425.

According to various embodiments of the present disclosure, the electronic device 201 may perform clustering on APs corresponding to the AP information included in the AP list information 430. For example, the electronic device 201 may perform clustering only if the number of APs included in the AP list information 430 is equal to or greater than a specified number (e.g., a natural number equal to or greater than 3).

According to an embodiment of the present disclosure, the electronic device 201 may perform clustering based at least on positions of APs corresponding to AP information included in the AP list information 430. For example, clustering may be referred to as a procedure for finding one cluster having the highest AP density. For example, when the set of APs included in the AP list information 430 is C, a set $C_i$ may be defined that includes, as elements, APs positioned within a specified distance $d_{th}$ centered on the position of the i-th AP included in the AP list information 430 (for example, i is an integer equal to or greater than 1 and less than or equal to the number of APs included in the AP list information 430). For example, the set $C_i$ may be defined as the following equation.

$$C_i = \{k | \text{dist}(i,k) \leq d_{th}, \forall k \in C\} \qquad \text{[Equation 1]}$$

In the above equation, k may be an integer equal to or greater than 1 and less than or equal to the number of APs included in the AP list information 430, and dist(i, k) may mean a distance between the i-th AP and the k-th AP.

According to an embodiment of the present disclosure, the electronic device 201 may perform clustering by using, among the sets $C_i$, the set $C_i$ containing the largest number of APs. For example, the electronic device 201 may determine a set $C_i^*$ to be used for clustering according to the following equation.

$$i^* = \operatorname*{argmax}_{i} |C_i| \qquad \text{[Equation 2]}$$

In the above equation, $|C_i|$ may mean the size of the set $C_i$. That is, the electronic device 201 may set the set $C_i$ so that the number of APs included in the set is maximum.

According to various embodiments of the present disclosure, the electronic device 201 may determine the representative position of the cluster. According to an embodiment of the present disclosure, the electronic device 201 may obtain a position of an AP serving as the center of the cluster (i.e., the position of the i*-th AP) as a representative position of the cluster. According to an embodiment of the present disclosure, the electronic device 201 may obtain the representative position based on the positions of APs included in the cluster. For example, the electronic device 201 may set, as the representative position, a position with the shortest average distance, the highest correlation, or the lowest variance with the positions of APs included in the cluster. According to an embodiment of the present disclosure, the electronic device 201 may obtain the representative position based on the arithmetic average of positions of APs included in the cluster. For example, the electronic device 201 may determine the representative position $x_i^*$ of the cluster (e.g., set $C_i^*$) according to the following equation.

$$x_{i^*} = \frac{1}{|C_{i^*}|} \sum_{k \in C_{i^*}} x_k \quad \text{[Equation 3]}$$

In the above equation, $x_k$ may mean the vectorized position of the k-th AP. Table 2 shows an exemplary form of $x_k$.

TABLE 2

| k | MAC address | SSID | Position (latitude, longitude) |
|---|---|---|---|
| 1 | 00:00:00:00:00:01 | AP1 | $x_1 = \{x_{lon1}\ x_{lat1}\}^T$ |
| 2 | 00:00:00:00:00:02 | AP2 | $x_2 = \{x_{lon2}\ x_{lat2}\}^T$ |
| 3 | 00:00:00:00:00:03 | AP3 | $x_3 = \{x_{lon3}\ x_{lat3}\}^T$ |
| 4 | 00:00:00:00:00:04 | AP4 | $x_4 = \{x_{lon4}\ x_{lat4}\}^T$ |
| 5 | 00:00:00:00:00:05 | AP5 | $x_5 = \{x_{lon5}\ x_{lat5}\}^T$ |

The setting method for the cluster (e.g., set $C_i$) and the representative position, which are described above, are exemplary, and embodiments of the present disclosure are not limited to the above setting method. According to an embodiment of the present disclosure, the electronic device 201 may simultaneously obtain the representative position and the cluster based on the positions of APs included in the AP list information 430. According to an embodiment of the present disclosure, the electronic device 201 may obtain the representative position based on the positions of APs included in the AP list information 430, and set the cluster centered on the obtained representative position. According to an embodiment of the present disclosure, the electronic device 201 may determine a cluster having the highest density of APs included in the AP list information 430 and obtain the representative position from the cluster. For example, the electronic device 201 may determine the density based on a ratio of APs in the cluster to all APs in the AP list information 430. For example, the electronic device 201 may determine the AP density of the cluster centered on the position of the i*-th AP according to the following equation.

$$\eta_{i^*} = \frac{|C_{i^*}|}{|C|} \quad \text{[Equation 4]}$$

For another example, the electronic device 201 may determine the AP density using a specified density estimation equation.

According to various embodiments of the present disclosure, the electronic device 201 may estimate the obtained representative position as the position of the external electronic device 202. For example, the electronic device 201 may transmit the representative position to the external electronic device 202 as the position information by using the communication circuit 390.

FIGS. 5A to 5G illustrate an AP cluster configuration of an electronic device according to various embodiments of the present disclosure.

In FIGS. 5A to 5G, the electronic device 201 is assumed to receive the AP list information 430 including the first AP 421, the second AP 422, the third AP 423, and the fourth AP 424, and the fifth AP 425 of FIG. 4 from the external electronic device 202.

Figure 5A:
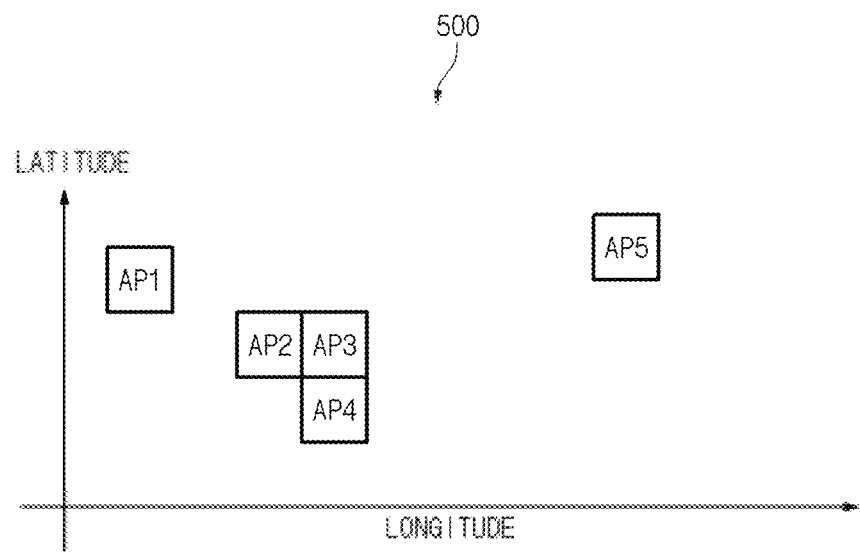
FIG. 5A illustrates an AP cluster configuration of an electronic device according to various embodiments of the present disclosure.

Referring to FIG. 5A, for example, in a database (e.g., the database 333 of FIG. 3) of the electronic device 201, the positions of APs included in the AP list information 430 may be stored as illustrated in FIG. 5A. For example, AP1 may indicate the position of the first AP 421 stored in the database 333, AP2 may indicate the position of the second AP 422 stored in the database 333, AP3 may indicate the position of the third AP 423 stored in the database 333, AP4 may indicate the position of the fourth AP 424 stored in the database 333, and AP5 may indicate the position of the fifth AP 425 stored in the database 333.

Figure 5B:
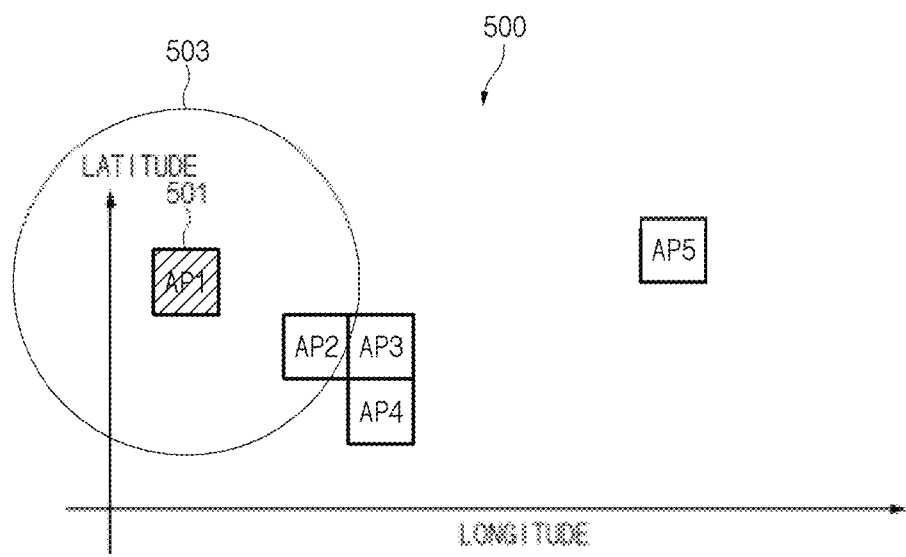
FIG. 5B illustrates an AP cluster configuration of an electronic device according to various embodiments of the present disclosure.
Figure 5C:
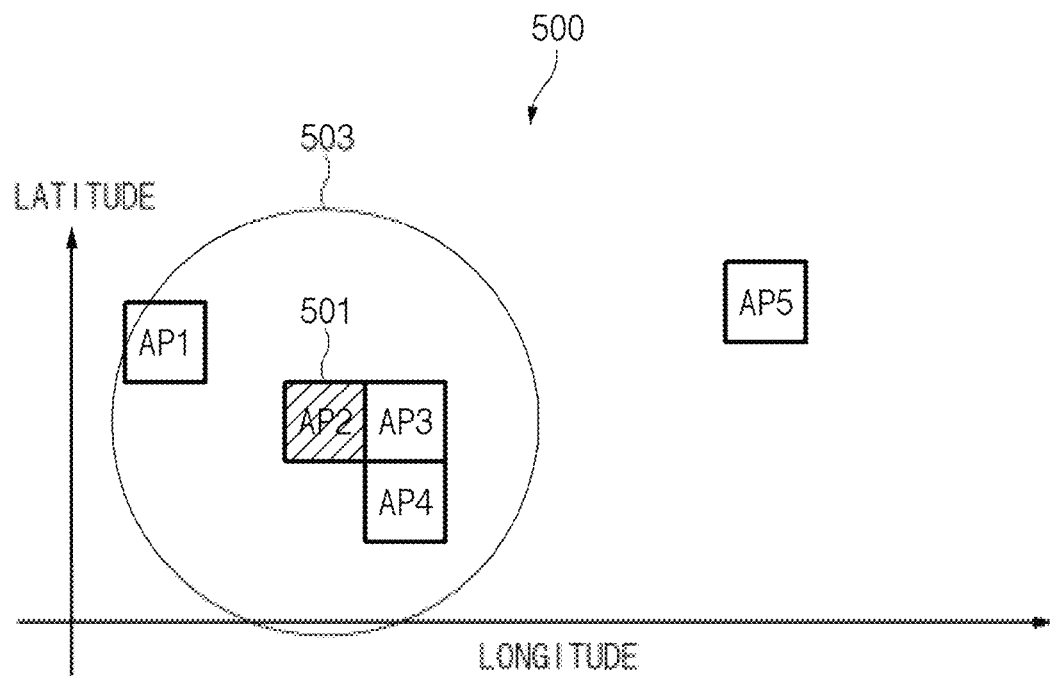
FIG. 5C illustrates an AP cluster configuration of an electronic device according to various embodiments of the present disclosure.
Figure 5D:
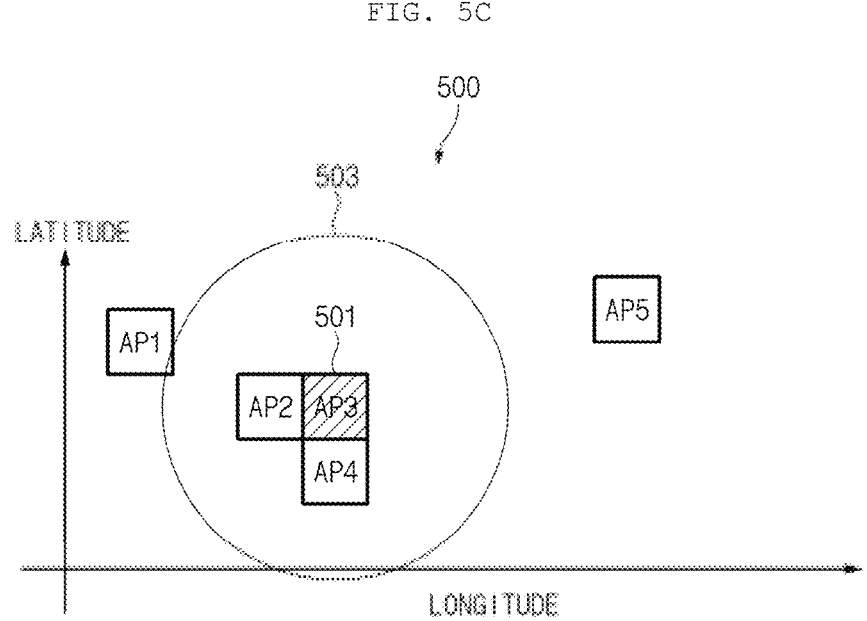
FIG. 5D illustrates an AP cluster configuration of an electronic device according to various embodiments of the present disclosure.
Figure 5E:
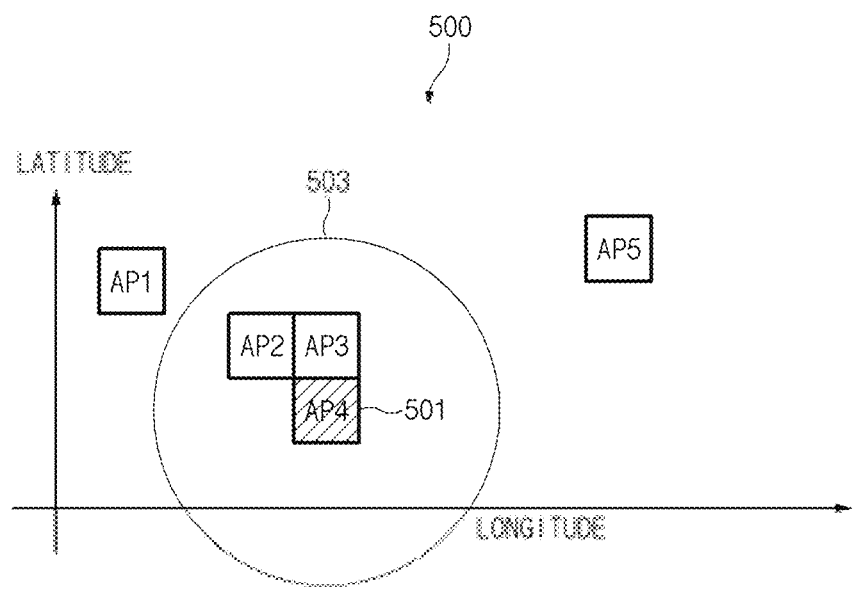
FIG. 5E illustrates an AP cluster configuration of an electronic device according to various embodiments of the present disclosure.
Figure 5F:
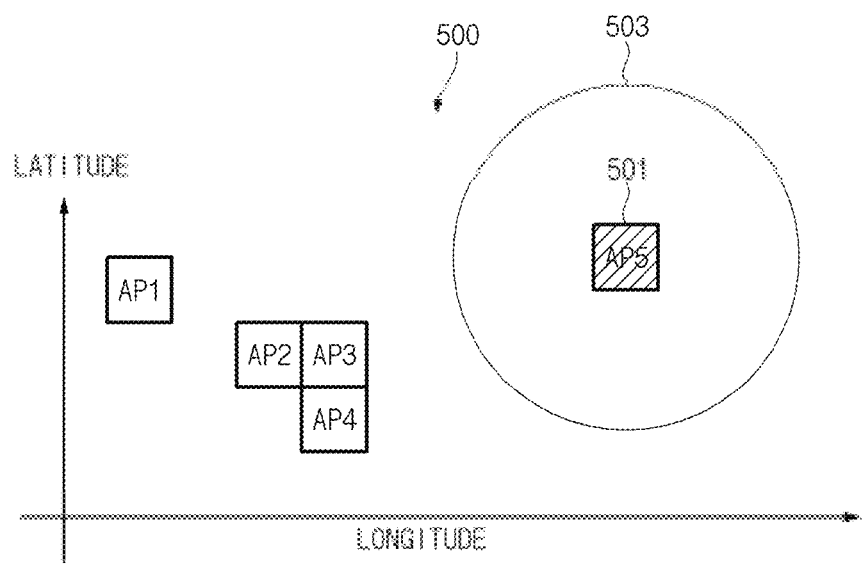
FIG. 5F illustrates an AP cluster configuration of an electronic device according to various embodiments of the present disclosure.

Referring to FIG. 5B, if AP1 is set as the representative position 501 of the cluster 503, two APs (AP1 and AP2) may be positioned in the cluster 503. Referring to FIG. 5C, if AP2 is set as the representative position 501 of the cluster 503, four APs (AP1, AP2, AP3, and AP4) may be positioned in the cluster 503. Referring to FIG. 5C, if AP2 is set as the representative position 501 of the cluster 503, four APs (AP1, AP2, AP3, and AP4) may be positioned in the cluster 503. Referring to FIG. 5D, if AP3 is set as the representative position 501 of the cluster 503, three (APs AP2, AP3, and AP4) may be positioned in the cluster 503. Referring to FIG. 5E, if AP4 is set as the representative position 501 of the cluster 503, three (APs AP2, AP3, and AP4) may be positioned in the cluster 503. Referring to FIG. 5F, if AP5 is set as the representative position 501 of the cluster 503, one AP (AP5) may be positioned in the cluster 503.

As illustrated in FIG. 5C, if the position of AP2 is set as the representative position 501, the largest number of APs may be positioned in the cluster 503. For example, as illustrated in FIG. 5C, the electronic device 201 may set the cluster 503 and set the position of AP2 as the representative position 501 of the cluster 503.

Figure 5G:
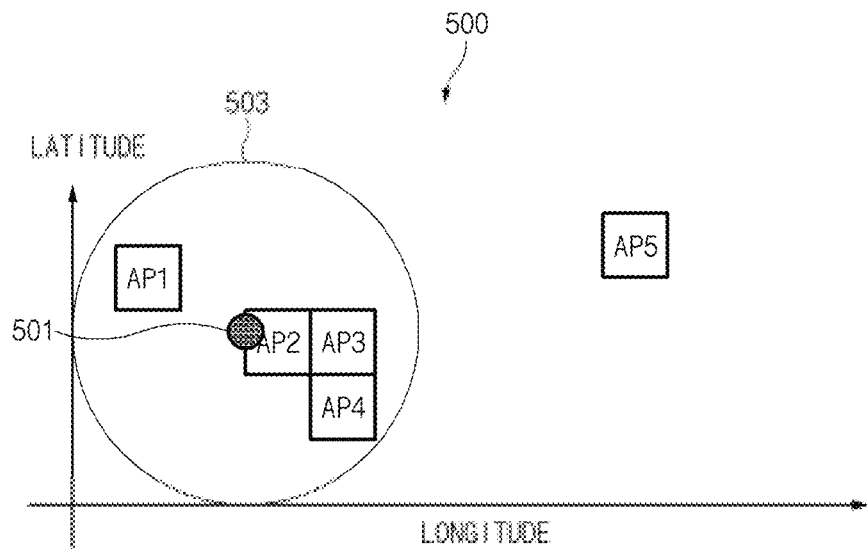
FIG. 5G illustrates an AP cluster configuration of an electronic device according to various embodiments of the present disclosure.

According to various embodiments of the present disclosure, the electronic device 201 may set the representative position based on the positions of APs included in the cluster 503. Referring to FIG. 5G, according to an embodiment of the present disclosure, the electronic device 201 may set the representative position 501 based on the positions of APs included in the cluster 503. For example, the electronic device 201 may determine the representative position 501 from an arithmetic average of positions of the APs included in the cluster 503.

Referring to FIG. 5G, according to an embodiment of the present disclosure, the electronic device 201 may set the cluster 503 based on the positions of APs included in the AP list information, and derive the representative position 501 from the cluster 503. According to an embodiment of the present disclosure, the electronic device 201 may determine the representative position 501 and the cluster 503 based on the positions of APs included in the AP list information.

Figure 6A:
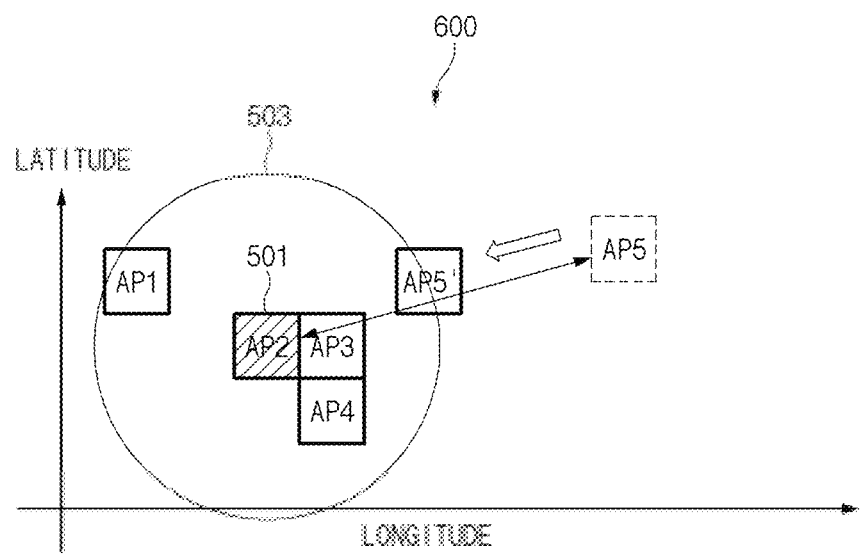
FIG. 6A illustrates an AP position update of an electronic device according to various embodiments of the present disclosure.

FIG. 6A illustrates an AP position update 600 of the electronic device 100 according to various embodiments of the present disclosure.

Referring to FIG. 6A, it is assumed that the representative position 501 is set for the position of AP2 and the cluster 503 is set around the position of AP2 as in FIG. 5C. As described above, the setting of the representative position 501 and the cluster 503 of the electronic device 201 are not limited to the example of FIG. 6A.

According to various embodiments of the present disclosure, the electronic device 201 may update the AP position by using the representative position 501. For example, if there is at least one AP (e.g., AP5) not included in the cluster 503, the electronic device 201 may update the position of at least one AP stored in the database (e.g., the database 333 of FIG. 3) by using the representative position 501. According to an embodiment of the present disclosure, if the AP density of the cluster 503 is equal to or greater than a specified value, the electronic device 201 may update the position of at least one AP by using the representative position 501. For example, if more than half of the APs in the AP list information are included in the cluster 503, the electronic device 201 may update the position of at least one AP by using the representative position 501. The density is exemplary, and the AP position update condition of the embodiments of the present disclosure is not limited thereto. For example, if there is a specified AP (e.g., an AP having high reliability of the position) in the cluster 503, the position of at least one AP may be updated independently of the density.

According to an embodiment of the present disclosure, the electronic device 201 may update the position of at least one AP (e.g., AP5) not included in the cluster 503 at least by using the representative position 501. For example, the electronic device 201 may update the position $x_i$ to $x_i'$ by using the specified weight a (0≤a<1) as in the following equation.

$$x_j' \leftarrow (1-\alpha)x^* + \alpha x_i \qquad \text{[Equation 5]}$$

In the above equation, x* may represent the representative position 501.

According to an embodiment of the present disclosure, the electronic device 201 may set the weight a based on the number of updates of the position of the AP. For example, the electronic device 201 may set the weight such that the value for the position of the AP decreases as the number of updates of the position of the AP in the database 333 increases. According to an embodiment of the present disclosure, the electronic device 201 may use the weight which has a fixed value.

According to an embodiment of the present disclosure, the electronic device 201 may store the number of updates of the position associated with each AP of the APs in the database 333. For example, the electronic device 201 may not use an AP having the number of updates of the position equal to or greater than a specified number to estimate the position of an external electronic device (e.g., the external electronic device 202 of FIG. 2).

Figure 6B:
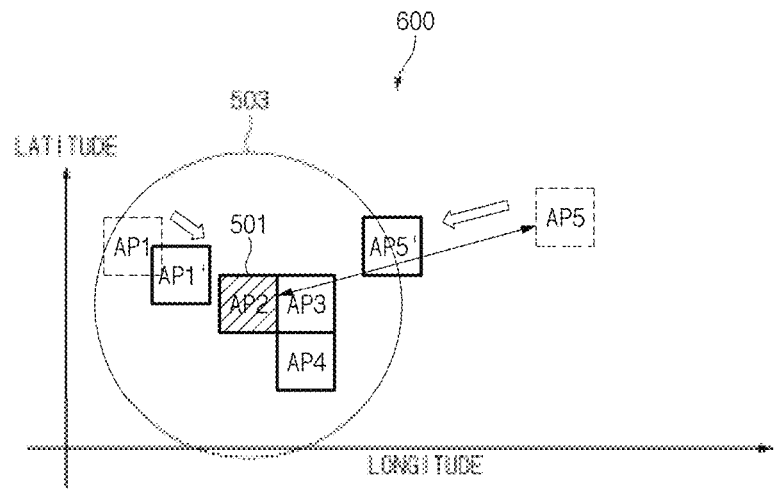
FIG. 6B illustrates an AP position update of an electronic device according to various embodiments of the present disclosure.

FIG. 6B illustrates an AP position update 601 of the electronic device 100 according to various embodiments of the present disclosure.

Referring to FIG. 6B, it is assumed that the representative position 501 is set for the position of AP2 and the cluster 503 is set around the position of AP2 as in FIG. 5C. As described above, the setting of the representative position 501 and the cluster 503 of the electronic device 201 is not limited to the example of FIG. 6B.

According to various embodiments of the present disclosure, the electronic device 201 may update the AP position by using the representative position 501. As described above with respect to FIG. 6A, the electronic device 201 may update the position of an AP (e.g., AP5) not included in the cluster 503. According to an embodiment of the present disclosure, referring to FIG. 6B, the electronic device 201 may update the position of an AP included in the cluster 503. For example, the electronic device 201 may update the position of an AP in the cluster 503 that satisfies a specified condition. According to an embodiment of the present disclosure, if the AP density of the cluster 503 is equal to or greater than a specified value, the electronic device 201 may update the position of at least one AP included in the cluster 503 by using the representative position 501. For example, if more than half of the APs in the AP list information are included in the cluster 503, the electronic device 201 may update the position of at least one AP by using the representative position 501. The density is exemplary, and the AP position update condition of the embodiments of the present disclosure is not limited thereto. For example, if there is a specified AP (e.g., an AP having high reliability of the position) in the cluster 503, the position of at least one AP may be updated independently of the density.

According to an embodiment of the present disclosure, the electronic device 201 may update the position of at least one AP (e.g., AP1) included in the cluster 503 at least by using the representative position 501. For example, the electronic device 201 may update the position of an AP according to Equation 5 by using the specified weight a (0≤a<1). In the example of FIG. 6B, although the position of the first AP is shown to be updated, the electronic device 201 may update the positions of all APs AP1, AP3, and AP4 included in the cluster 503.

According to an embodiment of the present disclosure, a weight for updating the position of an AP included in the cluster 503 and a weight for updating the position of an AP not included in the cluster 503 may be different from each other. For example, the weight may be set based at least on a distance between the representative AP and the AP of which position is to be updated.

Referring to FIGS. 6A and 6B, the electronic device 201 may update the position of AP5 stored in the database 333 to the position of AP5' by using the representative position 501. The methods for updating the AP position, which are described with reference to FIGS. 6A and 6B, are exemplary, and embodiments of the present disclosure are not limited thereto. According to an embodiment of the present disclosure, the electronic device 501 may perform the AP position update only if it is determined that the same AP has deviated from the cluster 503 associated with the AP list information more than a specified number.

Figure 7:
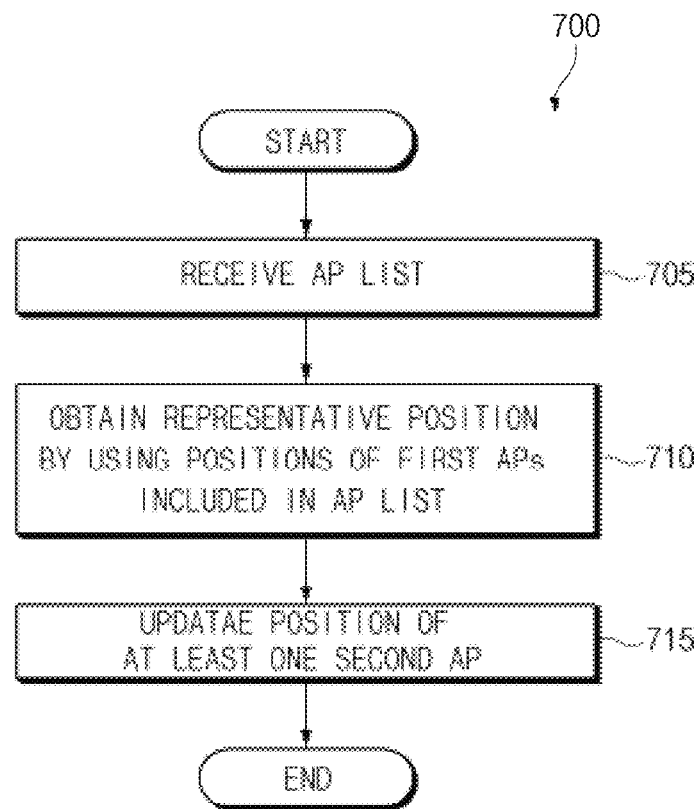
FIG. 7 illustrates a flowchart of a method for updating an AP position according to various embodiments of the present disclosure.

FIG. 7 illustrates a flowchart of a method 700 for updating an AP position according to various embodiments of the present disclosure.

Referring to FIG. 7, according to various embodiments of the present disclosure, in operation 705, the electronic device 201 may receive an AP list (e.g., the position information report 203 of FIG. 2 or the AP list information 430 of FIG. 4) from an external electronic device (e.g., the external electronic device 202 of FIG. 2). For example, the AP list may include information (e.g., AP identifiers) on a specified number of APs or more (e.g., 3 or more). For example, the AP list may include information on a plurality of first APs.

According to various embodiments of the present disclosure, in operation 710, the electronic device 201 may obtain a representative position by using positions corresponding to the first APs included in the AP list (e.g., the positions of the first APs stored in the database 333 of FIG. 3). For example, the electronic device 201 may obtain the representative position by using the examples described above with reference to FIGS. 4 to 6B.

According to various embodiments of the present disclosure, in operation 715, the electronic device 201 may update the position of at least one second AP among the first APs. For example, the at least one second AP may refer to a first AP that is a specified distance or more away from the representative position, among the first APs. For example, the at least one second AP may refer to a first AP that is not included in the cluster associated with the representative position, among the first APs. According to an embodiment of the present disclosure, the electronic device 201 may update the position of the second AP in the database 333 by using the representative position and the position of the second AP. For example, the electronic device 201 may update the position of at least one second AP by using to the examples described above with reference to FIGS. 6A and 6B.

Figure 8:
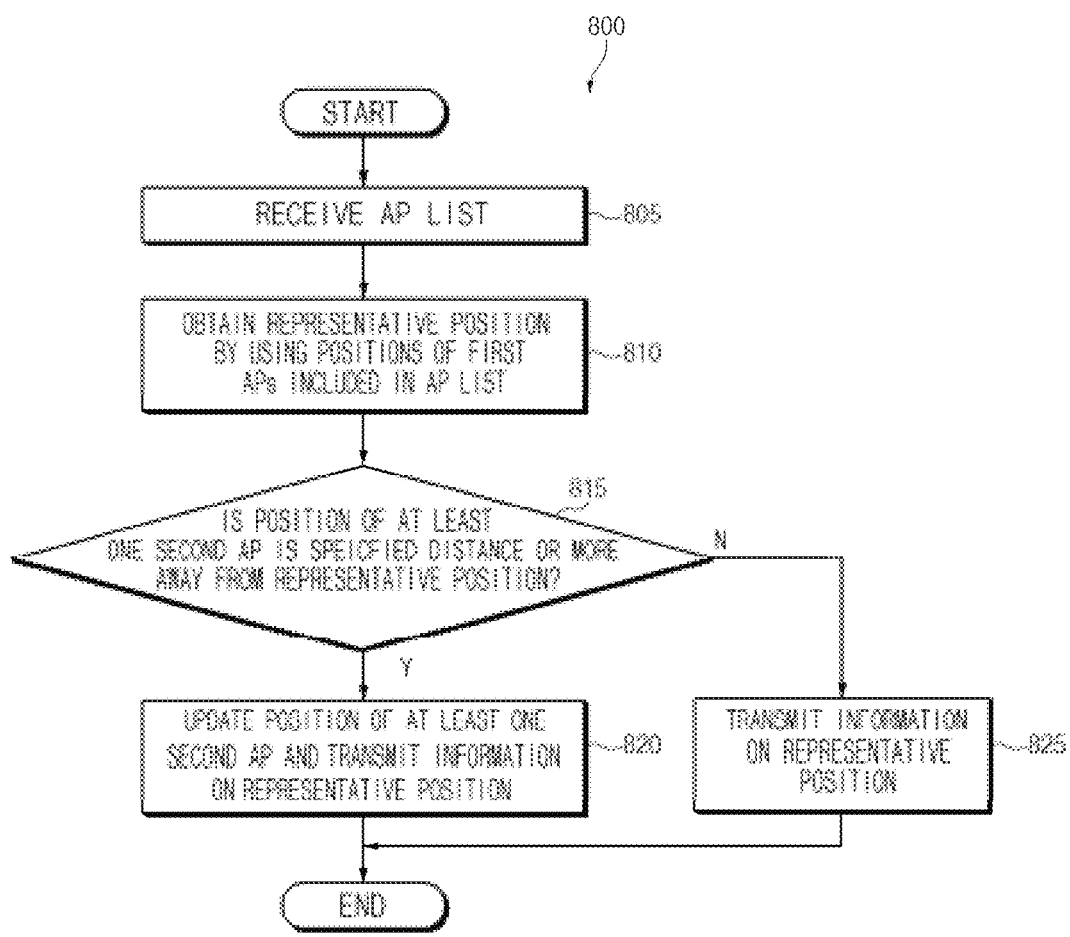
FIG. 8 illustrates a flowchart of a method for transmitting position information according to various embodiments of the present disclosure.

FIG. 8 illustrates a flowchart of a method 800 for transmitting position information according to various embodiments of the present disclosure.

Referring to FIG. 8, according to various embodiments of the present disclosure, in operation 805, the electronic device 201 may receive an AP list. The description of operation 805 may be referred to by description of operation 705 of FIG. 7. In operation 810, the electronic device 201 may obtain a representative position by using the positions of first APs included in the AP list. Description of operation 810 may be referred to by description of operation 710 of FIG. 7.

According to various embodiments of the present disclosure, in operation 815, the electronic device 201 may determine whether the position of at least one second AP of positions of the first APs stored in a database (e.g., the database 333 of FIG. 3) is a specified distance or more away from the representative position. In operation 820, if the position of at least one second AP is the specified distance or more away from the representative position, the electronic device 201 may update the position of the at least one second AP and transmit the representative position to an external electronic device (e.g., the external electronic device 202 of FIG. 2). Description of the updating of the position of the second AP may be referred to by description related to operation 715 of FIG. 7. In operation 825, if there is no first AP positioned the specified distance or more away from the representative position, the electronic device 201 may transmit representative position information to an external electronic device.

Figure 9:
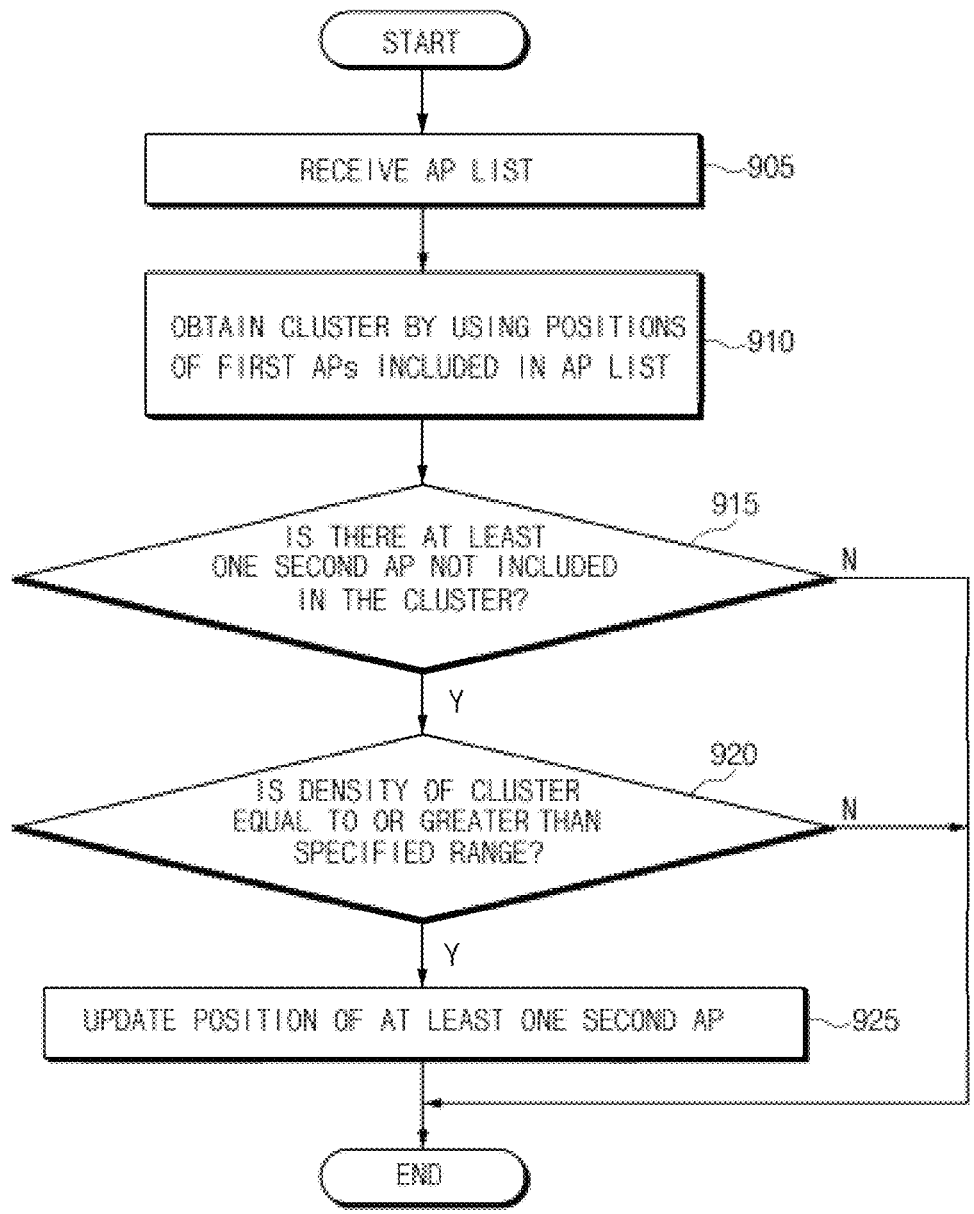
FIG. 9 illustrates a flowchart of a method for updating an AP position according to various embodiments of the present disclosure.

FIG. 9 illustrates a flowchart of a method 900 for updating an AP position according to various embodiments of the present disclosure.

Referring to FIG. 9, according to various embodiments of the present disclosure, in operation 905, the electronic device 201 may receive an AP list. Description of operation 905 may be referred to by description of operation 705 of FIG. 7.

According to various embodiments of the present disclosure, in operation 910, the electronic device 201 may obtain a cluster by using the positions of first APs included in the AP list. According to an embodiment of the present disclosure, the electronic device 201 may obtain a cluster including the largest number of first APs within a specified distance. For example, the electronic device 201 may obtain a cluster by using various methods described with reference to FIGS. 4 to 6B.

According to various embodiments of the present disclosure, in operation 915, the electronic device 201 may determine whether there is at least one second AP not included in the cluster among the first APs. If there is at least one second AP, in operation 920, the electronic device 201 may determine whether the density of the cluster is equal to or greater than a specified range. For example, the electronic device 201 may determine the density based on the number of APs included in the cluster in the number of APs included in the AP list. The density is exemplary, and for another example, in operation 920, the electronic device 201 may determine whether the number of first APs included in the cluster is equal to or greater than a specified number.

According to various embodiments of the present disclosure, in operation 925, if the condition in operation 920 is satisfied, the electronic device 201 may update the position of at least one second AP in the database 333. According to an embodiment of the present disclosure, the electronic device 201 may update the position of at least one second AP by using the representative position corresponding to the cluster. For example, the electronic device 201 may update the position of the at least one second AP by using the position of the at least one second AP and the representative position.

According to various embodiments of the present disclosure, an electronic device (e.g., the electronic device 201 of FIG. 3) may include a memory (e.g., the memory 330 of FIG. 3) storing identifiers of a plurality of access points (APs) and position information associated with the plurality of APs, at least one communication circuit (e.g., the communication circuit 390 of FIG. 3), and at least one processor (e.g., the processor 320 of FIG. 3) operatively connected with the memory and the at least one communication circuit. The at least one processor may receive an AP list including information on a plurality of first APs using the communication circuit, and obtain a representative position corresponding to at least a portion of the plurality of first APs based on positions corresponding to the plurality of first APs stored in the memory. The at least one processor may be configured to update position information of at least one second AP of the plurality of first APs stored in the memory based at least on the representative position if a position of the at least one second AP is a specified distance or more away from the representative position.

According to an embodiment of the present disclosure, the at least one processor may be configured to select the representative position such that the number of the first APs positioned within the specified distance from the representative position is maximized.

According to an embodiment of the present disclosure, the at least one processor may be configured to obtain the representative position if the number of the plurality of first APs is equal to or greater than a specified number.

According to an embodiment of the present disclosure, the at least one processor may be configured to update the position information of the at least one second AP stored in the memory based at least on the representative position if the number of first APs positioned within the specified distance from the representative position among the plurality of first APs is equal to or greater than a specified number.

According to an embodiment of the present disclosure, the at least one processor may be configured to update the position information of the at least one second AP stored in the memory by applying a specified weight to the representative position and the position of the at least one second AP, if the position of the at least one second AP is the specified distance or more away from the representative position.

According to an embodiment of the present disclosure, the representative position may correspond to a position of one representative AP of the plurality of first APs.

According to an embodiment of the present disclosure, the at least one processor may be configured to select the representative AP such that a sum of distances between the remaining first APs excluding the representative AP and the representative AP is minimized.

According to an embodiment of the present disclosure, information on the plurality of first APs may include a medium access control (MAC) address of each of the plurality of first APs.

According to various embodiments of the present disclosure, an electronic device (e.g., the electronic device 201 of FIG. 3) may include a memory (e.g., the memory 330 of FIG. 3) storing identifiers of a plurality of access points (APs) and position information associated with the plurality of APs, at least one communication circuit (e.g., the communication circuit 390 of FIG. 3), and at least one processor (e.g., the processor 320 of FIG. 3) operatively connected with the memory and the at least one communication circuit. The memory may store instructions that, when executed, cause the processor to receive an AP list including information on a plurality of first APs using the communication circuit, obtain a representative position corresponding to at least a portion of the plurality of first APs based on positions corresponding to the plurality of first APs stored in the memory, and update position information of at least one second AP of the plurality of first APs stored in the memory based at least on the representative position if a position of the at least one second AP is a specified distance or more away from the representative position.

According to an embodiment of the present disclosure, when executed, the instructions may cause the processor to select the representative position such that the number of the first APs positioned within the specified distance from the representative position is maximized.

According to an embodiment of the present disclosure, when executed, the instructions may cause the processor to obtain the representative position if the number of the plurality of first APs is equal to or greater than a specified number.

According to an embodiment of the present disclosure, when executed, the instructions may cause the processor to update the position information of the at least one second AP stored in the memory based at least on the representative position if the number of first APs positioned within the specified distance from the representative position among the plurality of first APs is equal to or greater than a specified number.

According to an embodiment of the present disclosure, when executed, the instructions may cause the processor to update the position information of the at least one second AP stored in the memory by applying a specified weight to the representative position and the position of the at least one second AP, if the position of the at least one second AP is the specified distance or more away from the representative position.

According to an embodiment of the present disclosure, the representative position may correspond to a position of one representative AP of the plurality of first APs.

According to an embodiment of the present disclosure, when executed, the instructions may cause the processor to select the representative AP such that a sum of distances between the remaining first APs excluding the representative AP and the representative AP is minimized.

According to various embodiments of the present disclosure, an access point (AP) position update method of an electronic device may include receiving an AP list including information on a plurality of first APs, obtaining a representative position corresponding to at least a portion of the plurality of first APs based on positions corresponding to the plurality of first APs stored in a memory of the electronic device, and updating position information of at least one second AP of the plurality of first APs stored in the memory based at least on the representative position if a position of the at least one second AP is a specified distance or more away from the representative position.

According to an embodiment of the present disclosure, the obtaining of the representative position may include selecting the representative position such that the number of the first APs positioned within the specified distance from the representative position is maximized.

According to an embodiment of the present disclosure, the obtaining of the representative position may include obtaining the representative position if the number of the plurality of first APs is equal to or greater than a specified number.

According to an embodiment of the present disclosure, the updating of the position information of the at least one second AP stored in the memory based at least on the representative position may include updating the position information of the at least one second AP stored in the memory based at least on the representative position if the number of first APs positioned within the specified distance from the representative position among the plurality of first APs is equal to or greater than a specified number.

According to an embodiment of the present disclosure, the updating of the position information of the at least one second AP stored in the memory based at least on the representative position may include updating the position information of the at least one second AP stored in the memory by applying a specified weight to the representative position and the position of the at least one second AP, if the position of the at least one second AP is the specified distance or more away from the representative position.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a memory storing identifiers of a plurality of access points (APs) and position information associated with the plurality of APs;
at least one communication circuit; and
at least one processor operatively connected with the memory and the at least one communication circuit,
wherein the at least one processor is configured to:
receive an AP list including information on a plurality of first APs using the at least one communication circuit;
obtain a representative position corresponding to at least a portion of the plurality of first APs based on positions corresponding to the plurality of first APs stored in the memory; and
update position information of at least one second AP of the plurality of first APs stored in the memory based at least on the representative position if a position of the at least one second AP is a specified distance or more away from the representative position and if a number of the first APs positioned within the specified distance from the representative position among the plurality of first APs is equal to or greater than a specified number.

2. The electronic device of claim 1, wherein the at least one processor is configured to select the representative position such that the number of the first APs positioned within the specified distance from the representative position is maximized.

3. The electronic device of claim 1, wherein the at least one processor is configured to obtain the representative position if the number of the plurality of first APs is equal to or greater than the specified number.

4. The electronic device of claim 1, wherein the at least one processor is configured to update the position information of the at least one second AP stored in the memory by applying a specified weight to the representative position and the position of the at least one second AP, if the position of the at least one second AP is the specified distance or more away from the representative position.

5. The electronic device of claim 1, wherein the representative position corresponds to a position of one representative AP of the plurality of first APs.

6. The electronic device of claim 5, wherein the at least one processor is configured to select the one representative AP such that a sum of distances between remaining first APs excluding the one representative AP and the one representative AP is minimized.

7. The electronic device of claim 1, wherein information on the plurality of first APs includes a medium access control (MAC) address of each of the plurality of first APs.

8. An access point (AP) position update method of an electronic device, comprising:
receiving an AP list including information on a plurality of first APs;
obtaining a representative position corresponding to at least a portion of the plurality of first APs based on positions corresponding to the plurality of first APs stored in a memory of the electronic device; and
updating position information of at least one second AP of the plurality of first APs stored in the memory based at least on the representative position if a position of the at least one second AP is a specified distance or more away from the representative position and if a number of first APs positioned within the specified distance from the representative position among the plurality of first APs is equal to or greater than a specified number.

9. The AP position update method of claim 8, wherein obtaining of the representative position includes selecting the representative position such that the number of the first APs positioned within the specified distance from the representative position is maximized.

10. The AP position update method of claim 8, wherein obtaining of the representative position includes obtaining the representative position if the number of the plurality of first APs is equal to or greater than theft specified number.

11. The AP position update method of claim 8, wherein updating of the position information of the at least one second AP stored in the memory based at least on the representative position includes updating the position information of the at least one second AP stored in the memory by applying a specified weight to the representative position and the position of the at least one second AP, if the position of the at least one second AP is the specified distance or more away from the representative position.

12. The AP position update method of claim 8, wherein the representative position corresponds to a position of one representative AP of the plurality of first APs.

13. The AP position update method of claim 8, wherein information on the plurality of first APs includes a medium access control (MAC) address of each of the plurality of first APs.

* * * * *